July 22, 1969  E. A. MALICK  3,457,082
PREPARATION OF RECONSTITUTED BEER
Filed Nov. 13, 1964
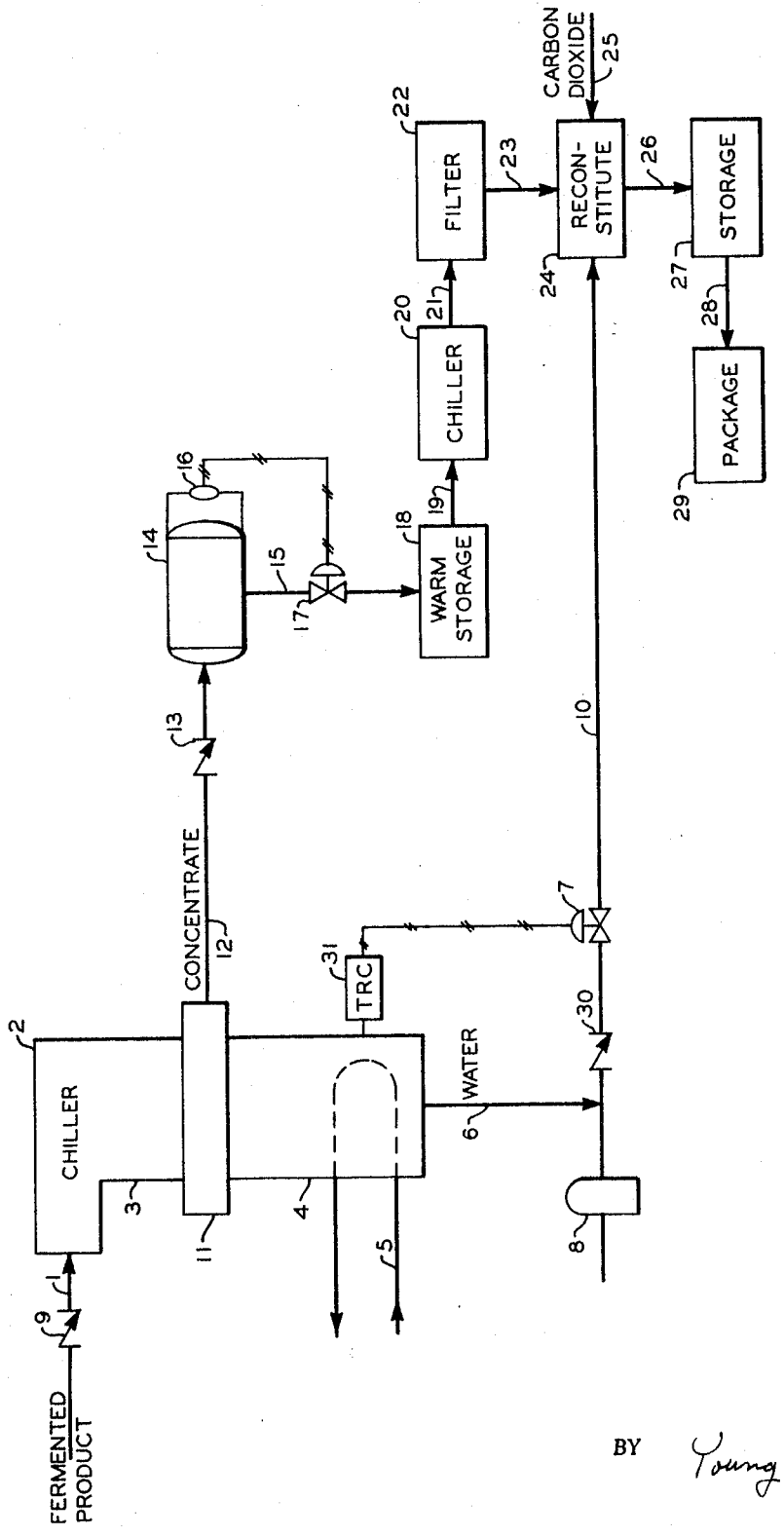
INVENTOR.
E. A. MALICK
BY  *Young and Quigg*
ATTORNEYS

United States Patent Office 3,457,082
Patented July 22, 1969

3,457,082
PREPARATION OF RECONSTITUTED BEER
Emil A. Malick, Bartlesville, Okla., assignor to Phillips Petroleum Company, a corporation of Delaware
Filed Nov. 13, 1964, Ser. No. 410,952
Int. Cl. C12h 1/22
U.S. Cl. 99—48                                    5 Claims

ABSTRACT OF THE DISCLOSURE

A method for making an alcoholic beverage comprising freeze concentrating same, storing the concentrate, cooling the concentrate, removing precipitate from the concentrate while in the cooled condition, and reconstituting the concentrate to produce the final beverage.

---

This invention relates to a method and apparatus for making improved, aged alcohol-containing beverages. This invention also relates to a method of making an alcoholic beverage without recourse to the normally required heat treatment to destroy microorganisms and thereby render said beverage biologically more stable, better known as pasteurization.

Although this invention will, for the sake of simplicity, be described in relation to beer beverages it should be noted that the invention is also applicable to other alcohol-containing beverages such as ale, wine and the like.

Generally after the fermentation operation the beer produced is greatly lacking as to both taste, i.e. harsh and bitter with a yeasty taste and/or aroma generally due to the presence of higher alcohols and aldehydes, and stability, i.e. from a biological and chemical point of view. Heretofore the taste and stability problems have been partially remedied by lagering, i.e. storing preferably at low temperatures. These lagering methods suffer from the disadvantage that large quantities of whole beer, i.e. both the final product containing the constituents which serve to make the product a beer type beverage and the large amount (about 90 weight percent) of water customarily present in the final product, must be kept at low temperatures for long periods of time under aseptic conditions thus requiring the use of large and expensive storage and cooling facilities.

Also, the beer made today must meet very strict requirements as to appearance and physical stability. The beer must be completely bright (clear) and must remain so for very long periods of time. Turbidities which consist primarily of protein-tannin and other compounds and which form in beer in due course of time and by cooling must not appear even though stored for long periods of time at room or lower temperatures by the consumer. Heretofore in order to improve the "shelf life" of the beer certain additives such as enzymes, e.g. pepsin, papain and the like, have been added to the finished beer. In addition, bentonite, tannin, activated carbon and the like have been employed in a filtration operation. However, such operations have not been completely successful in stabilizing the beer and suffer from the further disadvantage that they do, to some extent, diminish the head retention, i.e. foam, in the finished beer.

Further, pasteurization is important in order to destroy microorganisms which develop in the beer in due time and to render the beer biologically more stable. Heretofore pasteurization methods have been practiced which require preheating the containers, e.g. bottles, for the beer and also heating the beer itself for various and sometimes quite long periods of time, depending on the degree of pasteurization desired. Both of these procedures are undesirable as regards stability and taste. Besides the undesirable effects on stability and taste the apparatus necessary for pasteurization is expensive to procure and to operate.

It has now been found that the lagering function can be carried out more efficiently with no or significantly less need of treating whole beer and with no or significantly less dependence of beer quality on the storage of the beer at very low temperatures for long periods of time. It has further been found that no or significantly less recourse to additives such as enzymes, filtration with bentonite, and the like is necessary to effect an excellent appearance and stability. The above and other advantages are achieved by this invention by fractionally crystallizing the fermented beer to remove water therefrom and produce a beer concentrate having substantially greater alcohol content, preferably at least about double that of the fermented beer, storing said concentrate at a temperature of from about 50° to 100° F. for a period sufficient to allow aging by natural precipitation or agglomeration of the greater part of materials such as resins, proteins, ash, tannins and other precipitable and haze and sediment forming materials. The stored concentrate is then cooled to a temperature of from 20° to 40° F. to precipitate additional materials such as the protein-tannin compounds which form over a period of time and at cool temperatures and unfavorably affect a normally bright beer as to both appearance and stability. After the cooling of the concentrate the precipitated materials formed by both storing and cooling are removed while the concentrate is still in the cooled condition. The concentrate after removal of the materials can then be reconstituted, for example by the addition of water and carbon dioxide, to produce a beer which has an excellent taste, an extremely bright appearance, and an excellent stability.

It has further been found that due to the very high alcohol content of the beer concentrate produced by the fractional crystallization process, microorganisms which cannot live at such alcohol contents are killed (biocidal effect) while others are rendered inert or inactive (bacteriostatic effect). This can be achieved to a significant degree—significant in that it provides improved beer stability—without the use of pasteurization, and that if the steps of storing the concentrate at temperatures from 50° to 100° F., cooling the concentrate at temperatures of from 20° to 40° F., removing the materials which are precipitated during the storing and cooling steps, and the reconstituting step are all carried out under conditions equal in degree of sterility to that produced by exposure of the preheated apparatus involved to at least 300° F. steam for at least one minute, the very expensive pasteurization process is not necessary if the reconstituted beer is ultimately placed in equally sterile containers for sale to the consumer.

Accordingly, it is an object of this invention to provide a method and apparatus whereby an improved and less costly lagering process is achieved and a greatly improved beer is produced as to both appearance and chemical and physical stability. It is another object of this invention to provide a method and apparatus whereby a biologically more stable beer is produced without the use of expensive heat treatment to destroy microorganisms.

Other objects, advantages and features of the invention will be readily apparent to those skilled in the art from the description, the drawing and the appended claims.

The drawing shows diagrammatically a system employing this invention.

More specifically, the drawing shows a fermented product such as a fermented beer passing by 1 into chiller 2. Here the beer is cooled so that a slurry of ice crystals is formed in the beer concentrate or mother liquor. The solids content of the slurry should be as high as possible. A limiting factor will be the thickness of the slurry. If the slurry is too stiff it cannot be readily moved into and through the separation column. Ordinarily crystal slurries having greater than 65 percent solids cannot be efficiently processed and, more frequently, the solids content of the slurry is in the range of from about 40 to about 60 percent of the total slurry on a weight basis.

The slurry of ice crystals and mother liquor is passed from chiller 2 into separation column 3. The chiller 2 and the separation column 3 can be constructed as a single unit with the chiller being an upstream extension of the column, as shown, or the units can be separated and connected with a conduit. In separation column 3, the ice crystals are forced in a compact mass through the column into a body of water in the downstream end 4. This water is formed by melting the ice crystals by means of heating element 5, such as a resistance coil or a steam line. Water is removed from the downstream end 4 of column 3 through line 6 but the rate of water removal is restricted by motor valve 7 so that water is displaced by pulse unit 8 back into the advancing crystal mass. Check valve 9 in line 1 prevents backflow in that line on the forward stroke of pulse unit 8. Check valve 30 in line 10 prevents backflow of water through valve 7 on the backstroke of pulse unit 8. As the crystal mass is forced forward, the mother liquor is displaced from the column through filter section 11 from which it is withdrawn through line 12.

The mother liquor passes by 12 through check valve 13 into accumulator 14. The mother liquor is removed from accumulator 14 by 15 and thus removal is controlled by liquid level controller 16 operatively connected to motor valve 17. The mother liquor in 15 passes to warm storage zone 18 wherein it is maintained at ambient pressures and a temperature of from 50° to 100° F., preferably 70° F., for a period of time of from 1 to 7 months, preferably 3 months. The atmosphere in warm storage zone 18 should be inert and can be argon, nitrogen, carbon dioxide and the like. The mother liquor then passes by 19 to chilling zone 20 wherein it is cooled to a temperature of from 20° to 40° F., preferably 30° F., under ambient pressures and similar inert atmospheres. The residence time of the mother liquor in the chilling zone 20 should be sufficient to precipitate substantially all of the turbidities in said mother liquor and will generally be from 1 to 30 minutes, preferably 15 minutes. The chilled mother liquor then passes by insulated line 21 to precoated filter 22 so that the impurities precipitated and agglomerated therein can be removed from the mother liquor while in the chilled condition created by chilling zone 20. Generally, filtration can be achieved by any known filter, such as cotton fibers mixed with about 1 weight percent of asbestos fibers and compressed wet to a thickness of from 5 to 6 centimeters or by a kieselguhr filter. Beer concentrate is removed from filter 22 by 23 and can be packaged and shipped as concentrate to be reconstituted within another brewery or can be reconstituted by passing through reconstitution zone 24 wherein water withdrawn from column 3 by line 10 and carbon dioxide by 25 are mixed with the concentrate, diluting same and producing the desired beer end product.

The rate of withdrawal of water through 6 is controlled by temperature recorder controller 31 which is responsive to the temperature in 4 and is operatively connected to motor valve 7 so that, for example as the temperature in 4 rises above the set point of 31, motor valve 7 opens further to withdraw more water.

Although the invention has been described with reference to a single fractional crystallization operation it should be noted that more than one such operation can be employed in practicing this invention. For example, if two such operations are employed the second operation can utilize the mother liquor or concentrate as feed and therefore increase the alcohol content of that mother liquor by removing additional water therefrom.

Reconstitution with the purified water removed from the separation column is achievable since this water is of good quality and has an acceptable mineral content and also may contain trace amounts of alcohol and/or extract from the beer. Furthermore, such water will be of uniform characteristics and compatible with the concentrate since it was employed in the original brew and its use in reconstitution will not introduce new and objectionable characteristics into the reconstituted beer, such as minerals, gases, sulfur, chlorine, solids and the like.

Ordinarily, about 1 volume of carbon dioxide is added per volume of reconstituted beer. This, of course, depends upon the concentration of carbon dioxide in the reconstituted beer since the finished product should contain from about 2.5 to about 2.8 volumes of carbon dioxide per volume of beer. Reconstitution and carbonation can be carried out in separate steps or in a single step. The finished product beer then passes by 26 to storage zone 27 and then by 28 to packaging zone 29 to be placed in bottles or other containers for sale to the consumer.

Since the concentrate in line 12 has a substantially increased alcohol content over that of the fermented product in line 1, many infecting organisms which increase the acidity and otherwise deleteriously affect the flavor of the beer are destroyed. However, the bacteria such as lactic acid bacteria in the form of rods, e.g. lactobacilli, and in the form of cocci, e.g. pediococci, can develop during subsequent treatment of the beer concentrate and if carried through the filters can be very dangerous if the beer is not pasteurized. Normally, pasteurization is carried out in packaging zone 29. However, no pasteurization process is necessary if all of the operations subsequent to the concentration operation are maintained under conditions sufficiently sterile to minimize the growth of bacteria in the concentrate prior to reconstituting and packaging same. Generally, a sufficient degree of sterilization is achieved by exposure of the apparatus which is to handle the concentrate to at least 300° F. steam for at least one minute and preferably ten minutes.

Generally, the alcohol, i.e. ethanol, content of the solutions that can be employed in this invention will be at least 3 weight percent and preferably will vary from about 3 to 12 weight percent. Generally beer from the fermentor will contain from 3 to 6.5 weight percent alcohol, preferably 3 to 5 weight percent. The concentrate produced will then contain from 6 to 25 weight percent alcohol and the reconstituted beer will contain from 3 to 6.5, preferably 3 to 5, weight percent alcohol.

The method of concentrating beed according to this invention makes use of crystal purification columns such as are described in U.S. Patent Re. 23,810 to Schmidt and U.S. Patent 2,854,494 to R. W. Thomas. The crystallization process above described has many advantages over other known concentrating methods, which advantages appear to account, at least in part, for the results of this invention. One of these advantages is that the process is under positive pressure and is liquid full at all times and, for this reason, there are no interfaces of liquid and gas phases present. This means that there are no regions in the separation column where high relative velocities exist between liquid and gas phases, which might cause either vaporization (due to low pressures at the interface at high relative velocities) or shear and pickup of sheared liquid by the gas phase, all of which is of particular significance in the case of beverages such as beer since retention of flavor components, particularly volatile ones, is of great importance. Another advantage is that there are no moving parts in the separation column and for this reason there are no points where seals in contact with moving parts might cause wear, contamination due to such wear, or trapping of beer components which, once trapped, could undergo change and cause flavor or other quality degradation. Also, in this respect no foreign materials of any type, e.g. chemicals, solvents, lubricants, are present. Another advantage is that the need for separate mechanical means for removing trapped or occluded beer from ice crystals formed is completely eliminated because the water is separated out as water and not as ice crystals. The elimination of ice crystals in turn eliminates the need for washing of ice crystals, such as may be required by other processes in order to recover more of the occluded beer product. In addition to eliminating the operation itself, this in turn eliminates any dilution of the beer concentrate with such washings.

Finally, by employing the fractional crystallization process above, the lagering, i.e. aging, of the beer is accelerated significantly. One important effect of the lagering process is the clarifying of the beer by the precipitation and agglomeration of various materials. The particles which are removed during lagering are quite small and rather than each individual particle precipitating by itself it is necessary that these particles contact one another and agglomerate to form a larger particle agglomerate which is not affected by Brownian movements, convection and other mechanisms which tend to keep the individual particles from settling out. Thus, lagering not only is a time-dependent function but also is dependent upon the spacing of the particles in the beer. From this it can be seen that a very important factor in the lagering process is the relative spacing of the particles.

By the fractional crystallization process above a large amount of water is removed from the fermented beer and the concentrate formed has a greatly reduced volume. This volume reduction reduces the distance between the particles which must contact and agglomerate to settle out during lagering. Therefore, the probability of collision and agglomeration of these particles is increased exponentially due to the reduction in volume. For this reason the beer concentrate of this invention requires a significantly decreased time for lagering.

EXAMPLE I

Beer from a brewing fermentation operation and containing 1.6 volume of carbon dioxide (STP) per volume of liquid is cooled in a chiller to form a slurry. The beer from the fermentor contains 3.7 weight percent alcohol and 4.25 weight percent extract with the remainder water and carbon dioxide. The beer is cooled in the first chiller to 22° F., thereby forming a slurry of ice crystals in mother liquor, the slurry having a solids content of 50 percent. The slurry is passed through a crystal separation column wherein the ice crystals are melted and the resulting melt is withdrawn as purified water. Based upon 100 pounds of beer fed to the first chiller, 50 pounds of water and 50 pounds of mother liquor are withdrawn from the separation column. The mother liquor is passed to a warm storage zone and the temperature raised to 70° F. The mother liquor is maintained at 70° F. for about 3 months and then cooled to a temperature of 30° F. and held at this temperature for 15 minutes. The cooled mother liquor is then passed to a kieselguhr filter which has been pre-cooled to a temperature of 30° F. The filtered concentrate is reconstituted by adding thereto the water removed in the concentration column so that a purified beer having its original alcohol, extract and carbon dioxide content as received from the fermentors is obtained. The carbon dioxide content as received from the fermentors is maintained substantially constant by maintaining an equilibrium pressure of carbon dioxide in the mother liquor in the separation column at about 10 p.s.i.g. The feed pressure to the chiller is maintained at about 75 p.s.i. above the equilibrium pressure of the carbon dioxide in the corresponding mother liquor. Thus the feed pressure to the chiller is about 85 p.s.i.g. and the mother liquor outlet pressure from the column is maintained at about 25 p.s.i. above the corresponding chiller feed pressure so that the mother liquor discharged from the column is maintained at about 110 p.s.i.g. Thus, the pressure within the separation column is at all times maintained high enough to prevent evolution of gaseous carbon dioxide.

The reconstituted beer is carbonated by adding thereto 1 volume of carbon dioxide per volume of beer and the product is then metered, pasteurized and packaged for marketing.

EXAMPLE II

The same process is followed as in Example I except that the warm storage zone, chilling zone, filtering zone, reconstituting zone and conduits and other apparatus connecting said zone were sterilized by preheating to 400° F. and exposing to 400° F. steam for a period of 5 minutes prior to contact of said zones and other apparatus with the concentrate.

The beer concentrate is reconstituted in the manner of Example I, metered and tested for bacteria content by passing 20 cc. of the reconstitute through a 0.4 micron millipore filter, washing the filter with sterile water, placing the filter on a plate of nutrient agar and incubating same at 37° C. for three days. The microorganism per cc. count on the filter is substantially the same as that found in a reconstitute pasteurized at 60° C. for 20 minutes.

Reasonable variations and modifications of this invention can be made, or followed, in view of the foregoing, without departing from the spirit or scope thereof.

I claim:

1. A method of making improved, lagered beer comprising providing a fermented beer containing from 3 to 6.5 weight percent alcohol, concentrating said beer by cooling same to form a water crystal-mother liquor slurry, forcing said slurry into an elongated and confined separation zone, moving said crystals into a compact mass, advancing said compact mass into a body of liquid which is formed by melting the water crystals at a downsteam portion of said separation zone, displacing a portion of said liquid back into said advancing crystal mass to remove occluded mother liquor therefrom, separating from an upstream portion of said separation zone concentrated mother liquor which is a beer concentrate having an alcohol content of from 6 to 25 weight percent, storing said concentrate at a temperature of from 50° to 100° F. for a period of from 1 to 7 months to allow lagering by natural precipitation and agglomeration of haze and sediment forming materials, cooling said concentrate to a temperature of from 20° to 40° F. to precipitate additional haze and sediment forming materials therefrom, removing said materials from said concentrate while in the cooled condition and reconstituting said concentrate to produce a lagered beer having an alcohol content of from 3 to 6.5 weight percent wherein said method is conducted without the use of beer pasteurization and without the addition of additives to affect appearance and stability.

2. The method of claim 1 wherein the concentrate is stored at 70° F. for 3 months and the concentrate is cooled at 30° F. for 15 minutes.

3. The method of claim 1 wherein the storing, cooling, removing, and reconstituting steps are carried out under sterile conditions equal in degree of sterility to that produced by exposure to at least 300° F. steam for at least 1 minute.

4. A method of making beer without recourse to the normally required heat treatment to destroy microorganisms and to render said beer biologically stable which comprises providing a fermented beer containing from 3 to 6.5 weight percent alcohol, concentrating said beer by cooling same to form a water crystal-mother liquor slurry having a solids content from about 40 to about 60 weight percent, forcing said slurry into an elongated and confined separation zone, moving said crystals into a compact mass, advancing said compact mass into a body of liquid which is formed by melting the water crystals in a downstream portion of said separation zone, displacing a portion of said liquid back into said advancing crystal mass to remove occluded mother liquor therefrom, separating from an upstream portion of said separation zone mother liquor which is beer concentrate having an alcohol content of from 6 to 25 weight percent, storing said concentrate at a temperature of from 50° to 100° F. for a period of from 1 to 7 months to allow lagering by natural precipitation of materials, cooling said concentrate to a temperature in the range of from 20° to 40° F. and holding said concentrate in said 20° to 40° F. range for from 1 to 30 minutes to precipitate additional materials therefrom, removing said materials from said concentrate while in the cooled condition, reconstituting said concentrate to produce a lagered beer having an alcohol content of from 3 to 6.5 weight percent, each of said storing, cooling, removing and reconstituting steps being carried out under sterile conditions equal in degree of sterility to that produced by exposure of the apparatus involved to at least 300° F. steam for at least 1 minute, wherein said method is conducted without the use of beer pasteurization and without the addition of additives to affect appearance and stability.

5. The method of claim 4 wherein the concentrate is stored at a temperature of about 70° F. for about 3 months, the concentrate is cooled at a temperature of about 30° F. for about 15 minutes, and the sterile conditions are produced by exposure of the apparatus involved to 400° F. steam for about 10 minutes.

References Cited

UNITED STATES PATENTS

| 761,387 | 5/1904 | Monti | 99—205 |
| 3,128,188 | 4/1964 | McIntire | 99—48 |
| 3,216,833 | 11/1965 | McKay et al. | 99—199 |

OTHER REFERENCES

Essery, R.E., et al.; "Journal of the Institute of Brewing," vol. 68, September-October 1962, pp. 408–419.

DeClerck, J., A Textbook of Brewing, vol. 1, 1957, Chapman & Hall Ltd., London, pp. 432–433.

MAURICE W. GREENSTEIN, Primary Examiner

U.S. Cl. X.R.

99—31, 199